(12) United States Patent
Walter

(10) Patent No.: US 6,270,801 B1
(45) Date of Patent: Aug. 7, 2001

(54) APPARATUS AND A METHOD FOR TREATING PARTICULATE MATERIALS

(75) Inventor: Kim Walter, Lupsingen (CH)

(73) Assignee: Aeromatic-Fielder AG, Bubendorf (CH)

( * ) Notice: Subject to any disclaimer, the term of this patent is extended or adjusted under 35 U.S.C. 154(b) by 0 days.

(21) Appl. No.: 09/077,931

(22) PCT Filed: Dec. 2, 1996

(86) PCT No.: PCT/DK96/00503

§ 371 Date: Nov. 13, 1998

§ 102(e) Date: Nov. 13, 1998

(87) PCT Pub. No.: WO97/20625

PCT Pub. Date: Jun. 12, 1997

(30) Foreign Application Priority Data

Dec. 1, 1995 (DK) .................................................. 1365/95

(51) Int. Cl.$^7$ ............................ A61K 9/14; A61K 9/58; A61K 9/26; A61K 9/16
(52) U.S. Cl. ........................ 424/489; 424/464; 424/470; 424/458; 424/490
(58) Field of Search .................................. 424/489, 464, 424/490; 241/57

(56) References Cited

U.S. PATENT DOCUMENTS

| 4,556,175 | * 12/1985 | Motoyama et al. | ................ 241/57 |
|---|---|---|---|
| 4,623,098 | 11/1986 | Motoyama et al. . | |
| 4,724,794 | 2/1988 | Itoh . | |

FOREIGN PATENT DOCUMENTS

| 37 05 343 C2 | 9/1987 | (DE) . |
|---|---|---|
| 285 724 | 1/1991 | (DE) . |
| 0 526 394 A2 | 2/1993 | (DE) . |
| 0 214 714 | 3/1987 | (EP) . |
| 0 228 633 | 7/1987 | (EP) . |
| 0 505 319 A2 | 9/1992 | (EP) . |
| 0 544 289 A2 | 6/1993 | (EP) . |
| 0 608 844 A1 | 8/1994 | (EP) . |

OTHER PUBLICATIONS

Derwent's abstract, No. 86–317694/48,week 8648, Abstract of SU, 1223986 (Shirokova S G), Apr. 15, 1986 (detail 6).

* cited by examiner

Primary Examiner—Thurman K. Page
Assistant Examiner—S. Tran
(74) Attorney, Agent, or Firm—Sughrue, Mion, Zinn, Macpeak & Seas, PLLC

(57) ABSTRACT

In an apparatus for producing and/or processing granules, pellets or other particulate materials, having a rotary disc tight within a chamber and means for providing an upward gas stream through a slot between said disc and the chamber wall as well as means for spraying a liquid or steam onto the particulate material and possibly means for introducing powder for use in a powder layering process, the flow patter of the particulate material, which is maintained in non-fluidized condition, is improved by gas injection towards the center of the chamber or disc. A more uniform product having desired properties is obtained and the capacity is improved. The gas injection enables upscaling of apparatus and method.

14 Claims, 2 Drawing Sheets

APPARATUS AND A METHOD FOR TREATING PARTICULATE MATERIALS

FIELD OF THE INVENTION

The present invention relates to the field of particle processing including producing and/or processing granules, pellets or other particulate materials by granulating, coating, encapsulation or layering operations.

Various types of equipment and processes are commonly used, or have been suggested, to produce granulae from fine particulate materials and also to perform the other above specified operations on particulate materials.

Examples of apparatuses constructed for said purposes are the following: High-shear mixers, planetary mixers, drums and similar apparatuses having a tumbling effect, stationary or vibrated fluidized beds, and apparatuses characteristic in having a rotating disc at the bottom of a chamber and means for providing a gas flow through an annular slot between the disc and the chamber wall.

This last mentioned type of apparatus exists in two different embodiments, viz. one in which the particulate material is kept fluidized in a gas stream while it is subjected to the influence of the rotating disc, and one in which fluidization is avoided to obtain maximum control between the particles.

To create granulation, the surface of the primary particles to be granulated is wetted by spraying an atomized liquid onto the particles. Said liquid can be a solvent or a solution which in contact with the particle surfaces imparts a certain stickiness to the latter, or it can be a melt having the same capability. Alternatively, the particle surfaces can be wetted by condensation of vapour, such as steam, thereon.

The same applies to powder layering processes where the surface of particles, which can be primary particles, granulae or pellets, is wetted to make the surface thereof adhesive so that injected fine powder sticks thereto.

The granulation process and the characteristics of the product obtained thereby depend on various features among which are the following: The wetting process, the amount of mechanical compaction to which the materials are subjected, the influence of attrition to the particles during the process, and the degree to which the particles are in mutual contact during the process.

The above mentioned various types and embodiments of apparatuses for performing the operations in question all provide different conditions as to said specified features. Consequently, for any specific purpose a specific apparatus type among the above mentioned will normally be preferred.

For certain operations within the pharmaceutical area and also in certain branches of the food and refreshment industry preference is often given to apparatuses of the last mentioned of the above types, that is apparatuses which as main characteristics have a rotary disc in the bottom of a processing chamber and means for providing an upward gas stream through the annular space or slot between the disc and the walls of said chamber, said gas being provided in an amount less than the one which would cause fluidization of the particulate material being treated. Especially for producing pellets by layering powder onto particles that type of equipment is regarded as superior to the rest of the above exemplified apparatuses, and the present invention deals with such an apparatus.

BACKGROUND OF THE INVENTION AND REVIEW OF PRIOR ART

Related apparatuses are known. Thus EP 228633 B1 to Aeromatic AG discloses an apparatus termed Roto-Processor™ which has two treatment zones, an inner zone surrounding the rotating disc and an outer fluidized bed zone. Such an apparatus is used for several purposes, for example wet granulation pellettizing where a starting powder is granulated with water or binder solution and, if reuired, subsequently dried in the fluid bed zone, or for coating by spraying a liquid onto core material where several layers of coating can be applied using either the same or different coating liquids. The apparatus can also be used for layering from liquids where a starting product, e.g. inert cores, crystals etc., is being sprayed with an active substance dissolved or suspended in a liquid which liquid is simultaneously dried. Pellets can also be formed by layering from powders where a substance is added as a powder and is bound to the surface of cores or pellets by simultaneously spraying a liquid binder and subsequently or simultaneously drying the resulting pellets.

Another apparatus and a method for producing pellets by layering powder onto particles are disclosed in EP 505319 B1, where liquid and powder are introduced into the particle layer on the rotating disc by means of a nozzle protruding slightly into the zone above the disc.

A similar apparatus is disclosed in EP 526394 A2, which is specially designed for melt coating of particles.

Various auxiliary devices for these types of apparatuses are known. According to U.S. Pat. No. 4,556,175 the apparatus is supplemented with an agitator and in U.S. Pat. No. 4,623,098 furthermore a disintegrator is included.

EP-608844 A1 also deals with a method and an apparatus of the type in question for powder layering and is concerned with the adjustment of the relative amounts of liquid and solids in the process. According to the specification baffle means can be provided to the inner wall of the granulating vessel or the rotary disc for helping tumbling and fluidizing of the material being treated. The specification also mentions the possibility of introducing gas for drying through a portion of the side wall of the granulating vessel.

In the apparatuses in question the material to be treated is kept moving by a combination of mechanical force and gas flow. The material is propelled by the friction which exists between the rotating disc and the material. When the material gains velocity by the shear force in the disc's rotary direction, it will be moved in the direction of the chamber wall by the centrifugal force.

The processes: Granulation, powder layering and coating all demand wetting of the material, and it is essential for the achievement of a uniform product having the desired characteristics as to particle size, particle size distribution, physical strength, solubility etc., that the wetting process is performed very evenly on all particles forming the material. The wetting is usually made by atomizing a liquid by means of a two-fluid nozzle using a pressurized gas, e.g. pressurized air. It is, therefore, important that the material can be moved around inside the chamber in a controlled manner so that each part of the material passes the spray nozzle substantially the same number of times.

This uniform wetting of the particles is even more important in apparatuses of the type in question than in the high-shear apparatuses where the intensive mechanical processing facilitates a rapid equalizing of humidity on the particle surfaces.

With a view of obtaining a controlled movement of the particulate material and also a high drying capacity apparatuses resembling the one forming basis for the present invention have been provided with means for keeping the particulate material in fluidized condition.

An example of such an apparatus is disclosed in DE 37 05 343 C2. In said patent specification fluidizing gas is introduced through a number of slots in a rotating member in the bottom of the apparatus and also through the walls in the upper part thereof. The gas introduced through the walls form an angle to the radial direction, thereby increasing the velocity of the vortex-like movement in the chamber of the particulate material being treated.

However, for certain applications a fluidization of the material being treated is inappropriate in view of the result desired. Especially in powder layering processes the fluidizing gas blows off the finest particles and the contact between fine particles and cores, unto which the fine particles shall adhere, becomes insufficient.

It is, therefore, an object of the present invention to provide an apparatus of the discussed type, in which a controlled and uniform movement of the particulate material is obtained without fluidizing said material to any substantial extent. By avoiding fluidization a more efficient compaction is obtained, which is important especially in powder layering processes.

Besides, the consumption of pressurized gas is substantially reduced in comparison to the consumption when the particulate material has to be fluidized.

Most of the processing apparatuses of the type in question, that means apparatuses having a rotary disc forming the bottom of a chamber and having means for providing a gas stream upward through a slot between the disc and the chamber wall, hitherto commercially available are usually dimensioned to produce batches of product granulae being typically less than 20 kg and typical batch sizes are 10–15 kg.

There is a need for that type of apparatuses having a substantial higher production capacity. However, it has been experienced that simple upscaling of the dimensions of the known apparatuses to enable treatment of larger batches results in inferior and uneven product quality. Especially the size distribution of the granulae becomes too wide, and in layering or coating operations the variation between the treatment received by the individual particles becomes unacceptable high. This results in lacking reproducibility which is a serious drawback, especially when pharmaceutical products are processed.

This is due to the fact that while the momentum transferred from the disc to the particulate material, possibly increased by crevices or bulges on the disc, and the influence of the upward flow of gas between the periphery of the disc and the chamber wall is sufficient to obtain the desired movement of the particulate material at the moderate batch sizes hitherto used commercially, this is no longer sufficient to ensure the desired uniform movement of the total amount of non-fluidized particulate material when the batch size thereof is increased in an upscaled apparatus.

A more detailed explanation as to the failure of the known type of apparatuses to provide a uniform movement to large non-fluidized batches of particulate material is presented below in connection with the description of FIG. 3 of the drawing.

It has also turned out that the deficiencies of the apparatuses of known type, especially the insufficient and non-uniform powder movement, cannot be remedied by adjustment of operational features such as rotational speed of the disc.

Neither introduction of mechanical baffles into the processing chamber is sufficient to create a satisfactory particle movement in large batches. Although such means are able to provide a certain powder movement in otherwise too stationary areas, very irregular powder flow is created in the vicinity of the baffles, and in the area sheltered by the baffles particle movement becomes very unfortunate. In U.S. Pat. No. 4,724,794 it is suggested to improve the powder movement by substituting the rotary disc by plate means defining a plurality of annular slots opening at radial spacings to one another in a generally radially outward direction whereby pressurized gas blown out through said slots enhances the circulation of the charge material being treated in a radially outward direction. Preferably, the movement is also influenced by impulse blades on the rotating plate means and by stationary deflection plates, thereby imparting a treatment to the charge material of the same type as what is obtained in the above mentioned high-shear mixers.

To obtain the desired powder movement in an apparatus as the one suggested in said U.S. patent the powdery charge material will be subjected to such intense treatment that a high degree of compaction will result, for which reason the apparatus is mainly suitable for producing strong high-density particles, but less suitable for producing less compacted granules able to disintegrate into the elementary particles, as often desired when pharmaceuticals or food products are concerned.

SUMMARY OF THE INVENTION

It has now turned out that the above explained problem connected to the use of apparatuses of the defined type and having relative large dimensions for processing of larger amounts than hitherto conventional, can be solved by pneumatically sustaining the desired particle flow as explained below. Besides, it is hereby possible to obtain operational advantages and product improvements also in apparatuses of conventional size, treating conventional amounts of non-fluidized particulate material.

In a first aspect the invention deals with an apparatus for producing and/or processing granules, pellets or other particulate materials, having a chamber encircled by a wall being substantially rotation-symmetrical around a vertical axis, in the bottom portion of said chamber a substantially horizontal disc mounted on a vertical shaft axially in the chamber, means for rotating said shaft and said disc, an annular slot between the periphery of said disc and said wall, means for pneumatically preventing particles in the chamber falling down through said slot, and at least one nozzle for spraying a liquid or steam into the chamber above the disc. According to the invention this apparatus is characterized in having at least one gas injector debauching in said chamber, said injector being located and directed to provide a gas stream radially inward towards the axis of the chamber to promote movement of the material being treated towards the centre of the disc in the upper part of the area which during the operation of the apparatus is occupied by said material in moving state.

In contrast to the prior art apparatuses of the type disclosed in e.g. DE 37 05 343 C2, discussed above in which a fluidization of the particulate material is aimed at, the annular slot between the periphery of the disc and the chamber wall, which slot is preferably very narrow, meaning less than 1 mm, is the only entrance for gas in the bottom part of the apparatus, and the gas introduced through said slot serves to keep the slot and the immediate area above the slot free from particulate material and to impart a certain upward pneumatic transportation of the particulate material close to the chamber wall. Thus, the main portion of the zone occupied by the particulate material in the apparatus is not penetrated by the gas from said slot to any substantial extent, and consequently the particulate material is not fluidized but is kept moving as explained in more detail below, in relative compact condition by the influence of the rotating disc, and by the upward influence near the chamber wall caused by pressurized gas from the annular slot, and by the inward influence from the gas from said at least one gas injector in the upper part of the chamber.

In a further aspect the invention provides a method for granulating, coating and powder layering a particulate material using an apparatus as defined above, in which method a particulate material is introduced into the chamber, the substantially horizontal disc is rotated, thereby transporting the particulate material outwards, a stream of gas is blown through the annular slot in an amount sufficient to keep the slot and the area immediately above the slot free from particulate material and to promote an upward movement of particulate material along the chamber wall, but less than the amount which would fluidize said material in the apparatus, and a liquid (e.g. solution, suspension or melt) or steam is sprayed through said at least one nozzle. According to the invention this method is characterized in using a gas jet from said at least one gas injector to promote the movement of the particulate material from the periphery of the chamber to the centre of the disc in the upper part of the moving particle area.

The apparatus and the method according to the invention are generally suitable for granulating, coating and powder layering of particulate materials, but currently the high quality products obtainable thereby are especially in demand in the food industry and even more in the pharmaceutical industry. Especially in connection with the manufacture of pharmaceutical products having sustained or otherwise controlled release the apparatus and the method are suitable.

Accordingly, in a third aspect, the invention deals with a pharmaceutical product providing controlled release of an active drug in the human or animal body, which product is characterized in comprising granulae produced and/or coated by the method of the invention.

Below the invention is further explained with reference to the drawing.

BRIEF DESCRIPTION OF THE DRAWING

On the drawing

In the Figures identical reference numerals refer to identical or similar entities.

Referring to FIGS. 1 and 2 an apparatus is shown having a chamber 1, defined by chamber walls 2, and a lid 3.

Figure 1:
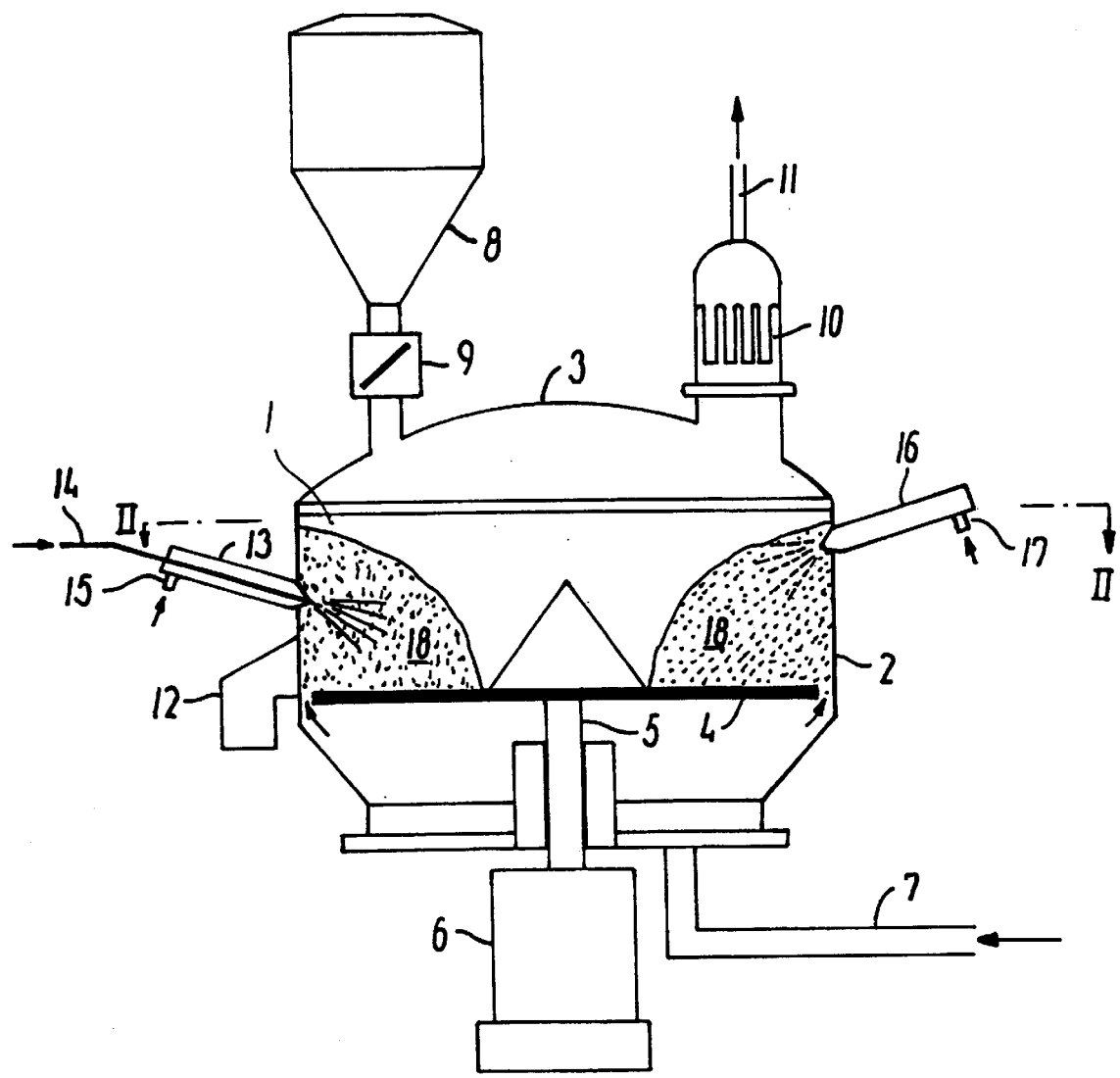
FIG. 1 is a schematic, vertical, sectional view of an apparatus according to the invention (control units and details not shown)

In the lower part of the chamber 1 a circular disc 4 is mounted on a spindle 5 which can be rotated by an electromotor 6. In the embodiment shown, the central portion of the disc 4 is covered by a conus to avoid settling of dust or other particulate material at the central portion of the disc.

Below the disc a plenum is connected to a duct 7 for supply of pressurized gas, for example pressurized air.

Above the lid 3 is a hopper 8 for powder to be granulated or for granulae or inert cores to be encapsulated by powder layering or film-coated. The hopper may also serve as part of a means for introducing fine powder into a powder layering process, but alternative means for such an introduction exist, as explained below.

To adjust the introduction of material from the hopper 8 to the chamber 1 a valve means 9 is provided for.

The lid 3 is also provided with a filter means 10 to collect fine particles entrained by a gas stream passing upwards through the filter. The filter is provided with means (not shown) for shaking or blowing collected particles from the filter surface back into the chamber 1. Gas having passed the filter 10 is exhausted through duct 11.

Near the disc 4 and close thereto a product-outlet 12 is provided in the chamber wall 2.

Nozzles 13 are inserted through the chamber wall 2 and debouch close to the interior surface of said wall. In the depicted embodiment five nozzles are used, as it appears from FIG. 2.

Preferably the nozzles are two-fluid nozzles, each having a liquid supply 14. Each nozzle is also connected to a conduit 15 for pressurized gas, usually pressurized air.

The liquid supplied through 14 can typically be a solution of a binder in a volatile solvent such as water or an organic solvent, or it can be a solvent which makes the surface of the material to be treated or the surface of powder used in a powder layering process sticky by dissolving components of said particle or said powder. Alternatively the liquid can be a melt which, when solidifying on the surfaces, exhibit a binding effect.

Alternatively the nozzle 13 can be a means for introducing steam which forms the desired stickiness of the particle surfaces by condensing thereon.

As a further alternative the nozzles 13 may be a combined means for injecting not only atomized liquid but also fine powder for use in a powder layering process. A device for such combined introduction of powder, liquid and atomizing gas is described in EP 505309 A2.

On FIGS. 1, 2 and 4, 16 designates a gas injector peculiar to the present invention. The gas injector is connected to a pressurized gas conduit 17, typically for supplying pressurized air at relatively high pressure, e.g. 6 bar.

On FIGS. 1, 3 and 4, 18 designates the area where particulate material will collect during the operation of the apparatus.

If, for example, a granulation process is performed in the apparatus, operation may be initiated as follows:

Pressurized gas is introduced through duct 7 to create an upward gas flow in the annular slot between the wall 2 and the disc 4 to prevent downward passage of particles through the slot and to sustain a pneumatic transport of the particulate material away from the area above said slot near the inner surface of the wall 2.

Rotation of the disc is initiated, and the charge of powder to be granulated is introduced from 8 through the valve 9 into the chamber.

Figure 3:
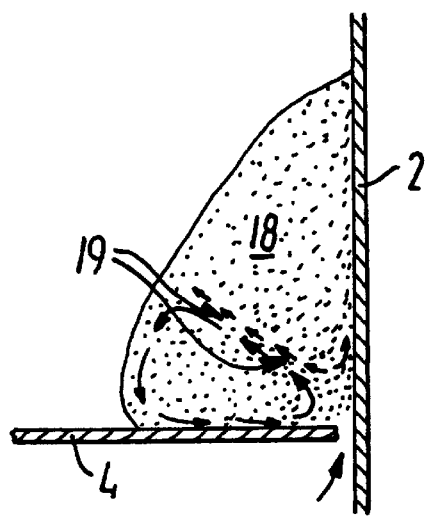
FIG. 3 is a schematic, partial, vertical, sectional view of the particulate-filled part of the chamber of a prior art granulation apparatus, showing the particulate flow therein.
Figure 4:
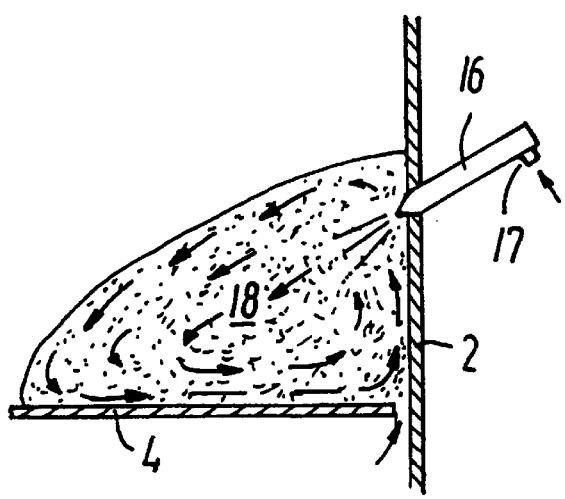
FIG. 4 is a schematic, horizontal cross-section similar to the one shown in FIG. 3, but with the improvement forming basis for the invention and thus illustrating the improved particle flow.

Influenced by the centrifugal force, the powder collects in an area which in FIGS. 1, 3 and 4 is termed 18.

The powder is, in the example selected, subjected to a spraying of atomized solution of a binder. The solvent in said solution is at least partly evaporated, leaving sticky surfaces on the moving powder, thereby causing an agglomeration thereof. By further agglomeration and compaction the powder is transformed into granulae having flow characteristics quite different from the starting powder.

To obtain granulae having a narrow size distribution it is essential that all parts of the powder receive the same treatment, which, inter alia, involves passing in front of a spray nozzle substantially the same number of times.

To obtain this it is essential that the movement or particle flow within the area, where the powder and the granulae accumulate, and which is subjected to the spraying from the nozzles, is very regular.

However, this cannot be achieved using prior art principles if the batch size is as large as desired.

FIG. 3 illustrates a flow pattern which is typical in a large non-fluidized batch, especially at the stage where a certain granulation has already taken place. As it is seen, a swirling flow exists in the lower part of the area 18 where the particles near the disc 4 flow towards the wall 2 and return towards the centre of the disc mainly through a zone 19 far from the upper part of the area 18. This means that insufficient movement of particles exists in the upper part of the area 18 above the zone 19, and spraying through a (not shown) nozzle into this area results in a very uneven distribution of the sprayed liquid on the particles.

FIG. 4 illustrates how this deficiency is remedied by using the principle of the present invention.

By injecting a pressurized gas from the gas injector 16 in a direction radially inward in relation to the disc, the movement of the particles in the upper part of the area 18 is changed to increase the movement of particles towards the centre portion of the disc. Thereby a flow pattern of the particles is created, which comprises the total area 18. This means that all particles participate in a swirling flow as indicated by the arrows in FIG. 4.

When an atomized liquid is sprayed onto or into the area 18, the conditions for obtaining a uniform wetting of all particles is substantially improved in comparison to the conditions existing when no gas injection is made as illustrated in FIG. 3.

Besides, the flown pattern shown in FIG. 4 ensures a more even mechanical treatment of all particles.

The gas injectors are preferably arranged to debouch at a location below the surface of the material being treated when operating the apparatus, that means within the area 18 in FIGS. 1 and 4. However, an improvement can also be obtained even if the gas injectors are situated at some distance above the area 18.

In an preferred embodiment of the apparatus the gas injectors are introduced through the chamber wall 2, and they debouch close to said wall. However, the gas injector may also be introduced otherwise, for instance through the lid 3 (embodiment not shown).

Figure 2:
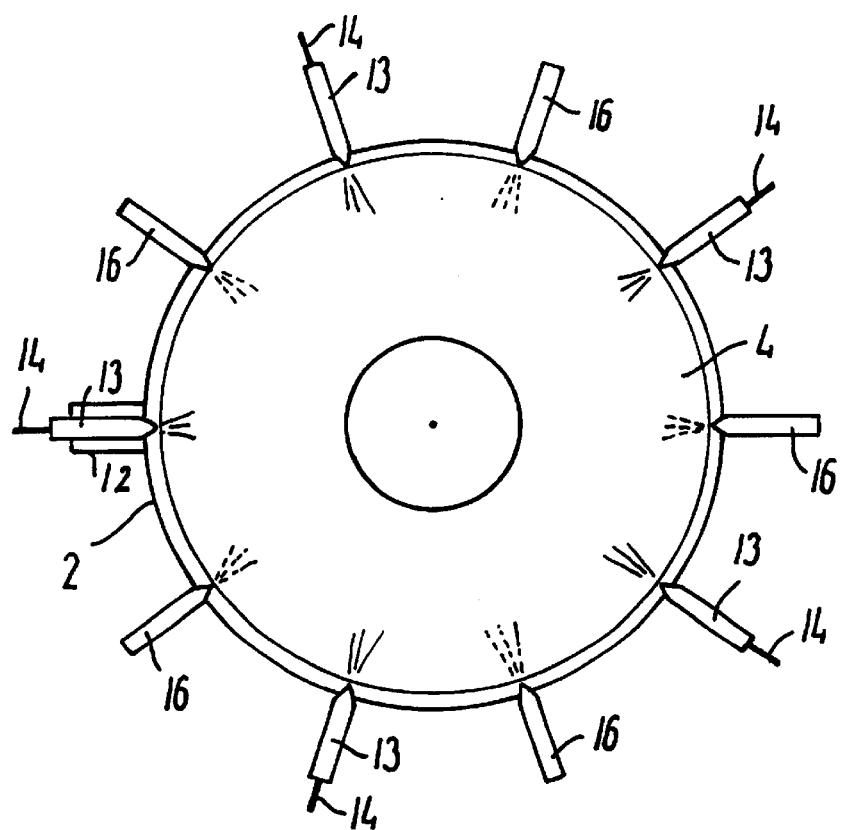
FIG. 2 is a schematic, horizontal, sectional view of the embodiment of the apparatus shown in FIG. 1. The section is made as indicated by II—II in FIG. 1 and the apparatus is shown in empty condition.

It is preferred to use a plurality of gas injectors evenly spaced along the chamber wall, for instance as depicted in FIG. 2.

Also the nozzles preferably debouch at a location being below the surface of the material being treated when operating the apparatus, and they preferably provide a spray of liquid droplets or steam in a direction having a radial inward component in relation to the disc 4.

When the apparatus is used in a powder layering process, the powder may, as explained above, be introduced either through the hopper 8 and valve 9 or through a combined nozzle, or dosing equipment of other construction (not shown) may be provided for, preferably in the lid 3.

To improve the contact between the particulate material and the liquid or steam injected through the nozzles it is preferred that the gas injectors are located and are directed or directable to produce a gas jet interacting with the spray of the nozzles. Thereby a quick passage of particles through the spray cloud is obtained to increase wetting capacity and to obtain an even wetting or coating.

In a preferred embodiment of the apparatus for utilizing this principle a plurality of liquid atomizing nozzles is introduced through the chamber wall at substantially the same level above the disc and evenly spaced in said wall, and a plurality of gas injectors introduced through the wall and evenly spaced is arranged at a level above the nozzles, and each of said injectors are directed or can be directed to produce a downward inclined gas jet. As alternative to the arrangement of gas injectors 16 and nozzles 13 shown in FIG. 2, the injectors can i.e. be placed directly over the nozzles.

The gas rate to be supplied to the injectors 16 depends on several parameters including the particle flowability changing during the process. The optimum gas rate can be determined experimentally.

By using embodiments of the apparatus where the direction of the gas injectors 16, and possibly also of the nozzles 13, can be adjusted not only vertically but also horizontally, it is possible on basis of simple experiments to establish optimal flow conditions.

Adjustment of the gas rate supplied to the injectors is of course a further very flexible means of controlling the process. Such adjustment also includes on-off regulation as well as the use of pulsating gas supply.

It may be preferred to increase the upward pneumatic transport of particulate material along the inner all of the treatment chamber by providing vertical grooves in said inner wall at the level of the rotating disc. Preferably, a number of such grooves can be evenly spaced along the inner circumference of the chamber wall. Each groove provides a passage for pressurized gas thereby locally increasing the upward particle movement. Preferably, the grooves can be arranged to cooperate with the nozzles or the gas injectors.

By using the above mentioned regulation and adjustment possibilities the process can be completely controlled regarding particle since distribution, and a batch can be processed in less time and in a reproducible way.

As mentioned above the present invention imparts advantages also to apparatuses designed for operating with batches of conventional size, for instance designed for maximum batches of 20 kg. However, the most important improvement is experienced using larger batch sizes where the unfortunate flow pattern explained in connection with FIG. 3 is more pronounced. Thus, a preferred embodiment of the method according to the invention is characterized in that the particulate material is treated in a batch size of at least 20 kg, preferably at least 50 kg, more preferably at least 80 kg. The diameter of an apparatus for such batches is typically up to 1½ m.

The injection of gas through the injectors 16 may have the further advantage that evaporation from the wetted particles and removal of vapours from the chamber are facilitated. The evaporation may further be improved by reducing the pressure in the chamber 1, as conventional. Alternatively or as supplement microwave heating may be applied. The gas supplied to the injectors and possibly to the nozzles, as well as the gas supplied to the annular slot through 7, will most often be air, however also the use of an inert gas, such as nitrogen or carbondioxide, for these purposes comes into consideration.

When operating the prior art apparatuses of the type in question, it is often necessary for the operator visually to monitor the process at all times to be able to interrupt the process and perform a manual mixing or to make other adjustments in case the above described unfortunate flow pattern is created.

The present invention reduces the risk that this undesired flow pattern is created to such an extent that the process becomes more suitable for automatical control. Thereby manpower costs are reduced.

In one of the preferred embodiments of the method according to the invention the supply of liquid or steam to the nozzles 13 and/or the supply of layering powder is effected in response to signals produced by at least one sensor means monitoring the particulate material during the treatment thereof, and/or in response to a pre-adjusted programme.

In another embodiment of the method the supply of gas to the gas injectors and/or the number of gas injectors used is controlled in dependency of values calculated in accordance with a programme taking into consideration signals obtained from automatic monitoring equipment connected to the chamber and indicating the changes of particle characteristics occurring during the treatment, and/or in response to a preadjusted programme.

Also a combination of the two last mentioned embodiments may be applied.

In a further preferred embodiment the supply of liquid to the nozzles and the possible introduction of layering powder is effected at a predetermined, variable rate to ensure automatic granulation and subsequent coating and/or powder layering on a batch of particulate material.

Although the apparatus and the method according to the invention has been developed essentially in connection with batchwise operation, the principle of the invention will also impart advantages in connection with a continuous or semi-continuous operation, for instance in processes where the material to be treated is passed in series through a number of treatment stations, each comprising an apparatus of the type shown in FIGS. 1 and 2.

What is claimed is:

1. An apparatus for producing and/or processing a particulate material, having a chamber encircled by a wall being substantially rotation-symmetrical around a vertical axis, in the bottom portion of said chamber a substantially horizontal tight disc mounted on a vertical shaft axially in the chamber, means for rotating said shaft and said disc, an annular slot between the periphery of said disc and said wall, means for pneumatically keeping said slot and an area immediately above the slot free from particulate material and for pneumatically supporting a transportation of particulate material upwards along the wall, and at least one nozzle for spraying a liquid or steam into the chamber above the disc, characterized in having at least one gas injector debouching in said chamber, said injector being located and directed to provide a gas stream inward against the axis of the chamber or the disc to promote movement of the material being treated towards the centre of the disc in the upper part of the area which during the operation of the apparatus is occupied by said material in moving state in non-fluidized condition.

2. An apparatus according to claim 1, characterized in that said at least one gas injector debouches at a location being below the surface of the material being treated when operating the apparatus.

3. An apparatus according to claim 1, characterized in that said at least one gas injector is introduced through the chamber wall and debouches close to said wall.

4. An apparatus according to claim 1, characterized in that it has a plurality of gas injectors evenly spaced along the chamber wall.

5. An apparatus according to claim 1, characterized in that said at least one nozzle debouches at a location being below the surface of the material being treated when operating the apparatus, and provides a spray of liquid droplets or steam in a direction having a radial inward component in relation to said disc.

6. An apparatus according to claim 1, characterized in further having means for introducing layering powder into the chamber.

7. An apparatus according to claim 1, characterized in that said at least one gas injector being located and directed or directable to produce a gas jet intersecting the direction of the spray of said at least one nozzle.

8. An apparatus according to claim 1, characterized in having a plurality of liquid atomizing nozzles introduced through the chamber wall at substantially the same level above the disc and evenly spaced in said wall, and a plurality of gas injectors also introduced through the wall and evenly spaced at a level above the nozzles, each of said injectors being directed or directable to produce a gas jet inclined downwards.

9. An apparatus according to claim 1, characterized in further having vertical grooves in the inner surface of the chamber wall at the level of the disc.

10. A method for granulating, coating and/or powder layering a particulate material in non-fluidized condition using an apparatus as defined in any of claims 1–9, in which a particulate material is introduced into the chamber, the substantially horizontal disc is rotated, a stream of gas is blown through the annular slot for keeping said slot and the area immediately there above free from particulate material and to support movement of particulate material upwards near the wall, and a liquid or steam is sprayed through said at least one nozzle, characterized in using a gas jet from said at least one gas injector to promote the movement of the particulate material in non-fluidized condition from the periphery of the chamber to the centre of the disc in the upper part of the moving particle area.

11. A method according to claim 10, characterized in that the gas jet is used to influence the contact of the particulate material with the nozzle spray to obtain a uniform treatment of the particulate material.

12. A method according to claim 10, characterized in treating the particulate material in a batch size of at least 20 kg.

13. The method according to claim 10, characterized in treating particulate material in a batch size of at least 50 kg.

14. The method according to claim 10, characterized in treating particulate material in a batch size of at least 80 kg.

* * * * *